Sept. 18, 1956

C. A. DOPP ET AL 2,763,287

SWING CHECK VALVE

Filed Nov. 15, 1952

Inventors.
Carl A. Dopp, &
Raymond P. Setka.
By Joseph O. Lange Atty.

Sept. 18, 1956 C. A. DOPP ET AL 2,763,287
SWING CHECK VALVE

Filed Nov. 15, 1952 4 Sheets-Sheet 2

Inventors.
Carl A. Dopp, &,
Raymond P. Setka.
By Joseph O. Lang Atty.

Sept. 18, 1956   C. A. DOPP ET AL   2,763,287
SWING CHECK VALVE
Filed Nov. 15, 1952   4 Sheets-Sheet 3

Inventors.
Carl A. Dopp, &
Raymond P. Setka.
By Joseph O. Lange
Atty.

Sept. 18, 1956 C. A. DOPP ET AL 2,763,287
SWING CHECK VALVE
Filed Nov. 15, 1952 4 Sheets-Sheet 4

Inventors.
Carl A. Dopp, &
Raymond P. Setka.
By Joseph O. Lang Atty.

United States Patent Office 2,763,287
Patented Sept. 18, 1956

2,763,287

SWING CHECK VALVE

Carl A. Dopp, Park Ridge, and Raymond P. Setka, Chicago, Ill., assignors to Crane Co., Chicago, Ill., a corporation of Illinois Application November 15, 1952, Serial No. 320,682

5 Claims. (Cl. 137—527.8)

This invention relates generally to valves, and more particularly, is concerned with pivotal or swing check valves of the tilting disc type.

Heretofore, one of the objections to the tilting disc type of valve has been the requirement to make the body or casing in a plurality of parts bolted or otherwise secured together or else when the body has been made integral it has frequently been necessary to remove the valve from the pipeline when inspecting or replacing internal parts.

It is therefore one of the more important objects of this invention to provide a valve of one-piece or integral body construction in which the valve disc or closure member and the supporting structure are easily removable for inspection, cleaning or replacement without the necessity of taking the valve body or casing out of the pipeline and thus avoiding costly and undesirable pipe joint severance.

Another object is to provide a valve in which the valve disc or closure member and the supporting structure in the preferred form also the securing means for retaining the supporting structure within the valve and are removable as a unit and also easily remounted in the valve in operating position.

A further object of this invention is to provide a valve closure and supporting structure unit which may be quickly and easily mounted within the valve casing in position for positive seating of the closure member with a separate valve seat.

In contrast with structures of the past, in which the valve seat has been made integral with the closure support, the present arrangement does not require a pressure sealed relation between the supporting structure and the inside of the valve or the valve seat member, as the latter member is separately mounted in pressure sealed relation within the valve body or casing. Therefore, only nominal force is necessary to secure the unit in position.

Another object is to produce a valve having a supporting member in one form of the invention and supporting member and securing means in another form which provide respectively substantially unbroken, non-turbulent fluid flow through the central portion of the valve casing.

A still further object is to provide a valve of compact design and reduced weight and cost which is comparatively easy to make and one requiring a minimum of internal machining.

Other objects and advantages will become more readily apparent upon proceeding with the specification, read in light of the accompanying drawings in which—

Similar reference numerals refer to similar parts throughout the several views.

Figures 1, 5:
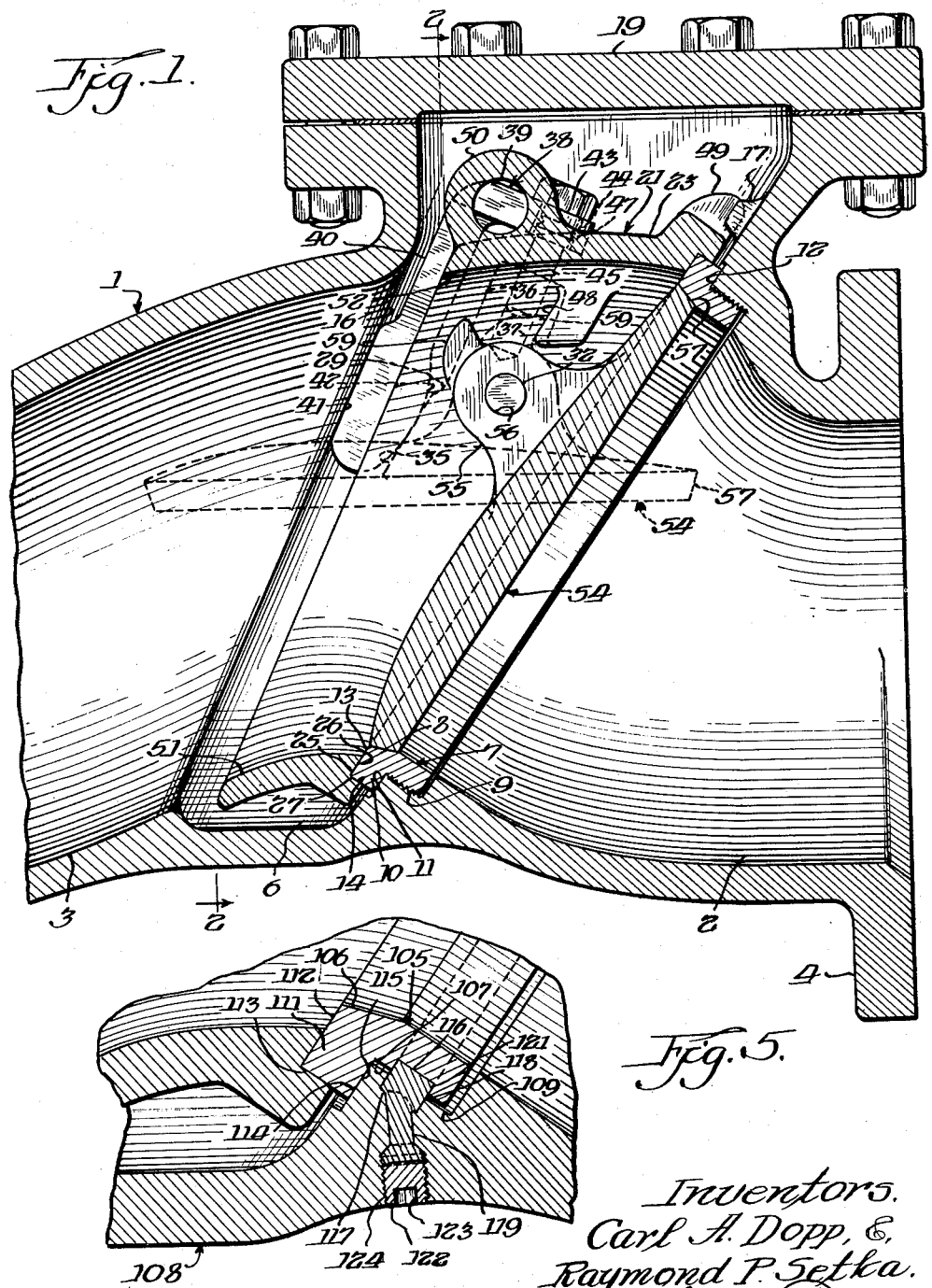
Fig. 1 is a sectional assembly view of one form of valve embodying the present invention.
Fig. 5 is an enlarged fragmentary sectional view showing a novel removable valve seat applicable to the above forms of valve.
Figure 2:
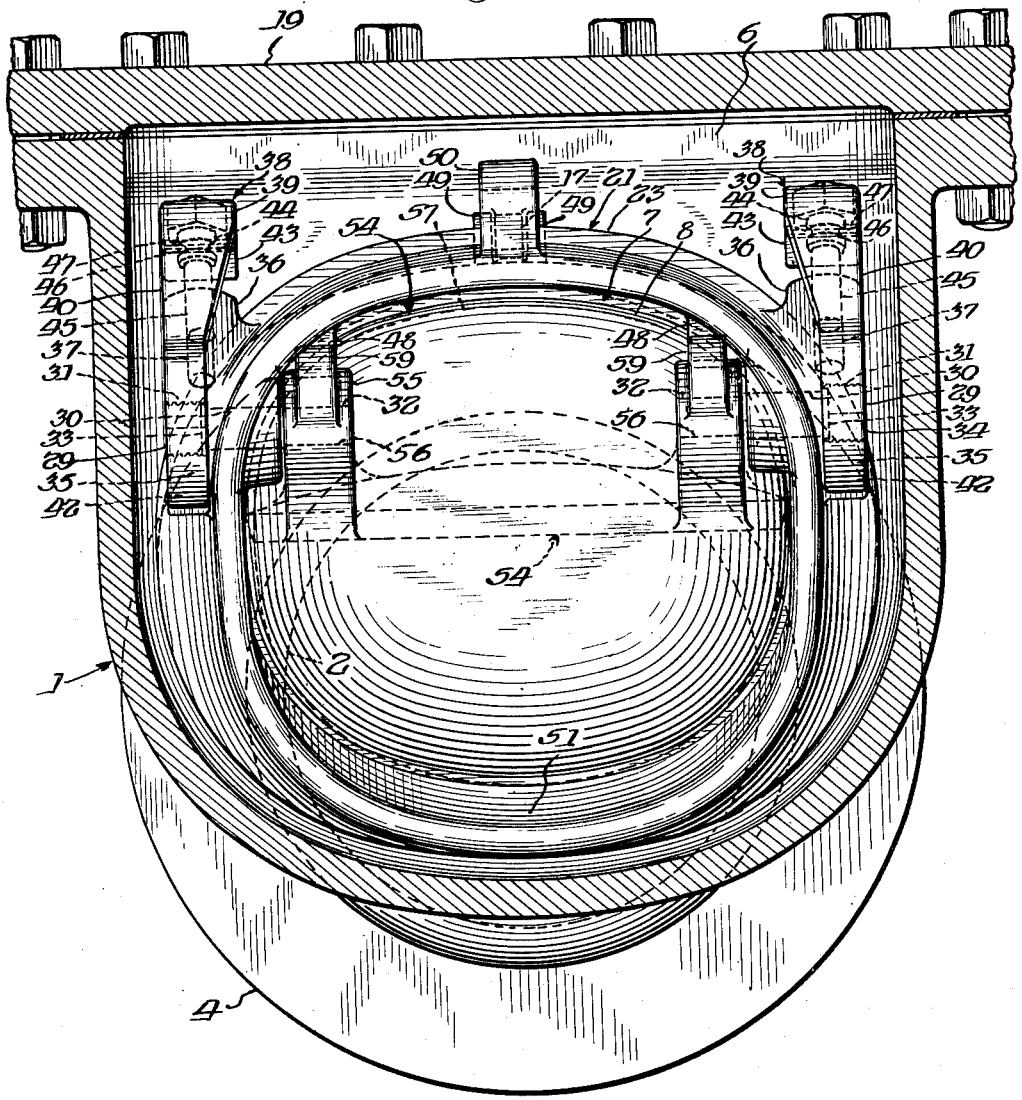
Fig. 2 is a sectional view taken on line 2—2 thereof.

Referring now to Figs. 1 and 2, the casing or valve body is generally designated 1 and is provided with usual inlet and outlet passages or ports 2 and 3 respectively and end flange 4 at the inlet end and a similar flange at the outlet end (not shown) for attachment to a pipeline. The ports 2 and 3 communicate inwardly with a generally wedge shape valve chamber 6 in the center portion of the body. This chamber is open at the upper end for ready removal of a valve disc or closure unit, generally designated 21, mounted therein. An annular seat ring or valve seat member generally designated 7 having a seating surface 8 is threadedly received at 9 at one side of the valve chamber within a portion of the body or casing 1. The seat member is provided with an annular flange 10 protruding into the valve chamber 6, the flat surface 11 of which is arranged in substantially fluid sealing contact with a corresponding annular surface 12 of the body or casing 1.

The removable valve disc or closure unit 21 includes a ported or substantially annular, tubular housing 23 which is also a supporting or mounting member and a valve disc or closure member 54 mounted thereon for pivotal movement within the hollow interior thereof. The housing or supporting member 23 is recessed around the inner periphery at 25 adjacent the forward or inlet end thereof forming a flat annular shoulder 26 open to that end and in abutting relation with flat annular surface 13 of the flanged portion 10 of the valve annular seat member 7. The shoulder is joined to the forward end by a cylindrical surface 27 on the inside of what is in effect a protrusion or collar. This surface cooperates with cylindrical surface 14 of the flanged portion 10 of the valve seat in relatively close fitting relation to position and afford positive retention of the supporting or housing member 23 and insure proper seating of the annular surface 57 of the closure member 54 with seating surface 8 of the valve seat member.

On each side of the interior of the tubular housing or supporting member, a boss or thickened portion 29 is arranged containing a bore or circular recess 30 counterbored at 31 for the reception of trunnions or pivot pins 32 which support the closure member 54 in its pivotal movement. These pins are provided with heads at 33 to prevent their being displaced inwardly and falling out and are received at the inner ends within recesses or apertures 56 in rearwardly extending hinge lug portions 55 of the closure member. Removable threaded members 34 retain the pivot pins in position within the supporting or mounting member 23. At the rear of each of the bosses 29, a flat surface 35 is provided which extends in the opposite direction to effect the shouldering at 26 and which is inclined thereto for effecting a wedging action. The upper part of the bosses or thickened portions contain threaded holes 37 for the reception of screws 45 of the wedge assembly generally designated 38 which is integral with the tubular housing or supporting member 23.

This assembly is removable therewith and comprises L-shaped wedge members 39 having depending portions 40 extending downward between the housing member 23 and the flat wall or inner surface 16 of the valve chamber 6. Threaded means, such as screws 45, are provided at the top for tightening of the wedges and effecting adjustment of the wedging force. Each of the wedge members is provided with rearwardly facing flat surface 41 and a forwardly directed curved surface 42 cooperating with the inner surface 16 of the valve body and the rearwardly facing exterior inclined surfaces 35 of the housing member 23 thereby to secure or wedge the latter member firmly within the valve chamber 6 and positioned in abutting and centered relationship with the inwardly protruding flanged portion 10 of the annular valve seat member 7. Each of the wedge members 39 has an upper arm 43 extending forwardly over the housing member 23 joined thereto by the screws 45 extending through apertures 44 in each of the arms and into the threaded holes 37 in the bosses 29 of the supporting members. The wedge members are secured to the screws and prevented from relative movement therealong by means of the pins 47 which extend through the arms 43 of the wedge member and into a continuous recess 46 around the screws. The screws 45 are accordingly free to rotate within the wedge arms, predetermined rotation of the screws raising or lowering the wedge members by means of the threaded engagement of the screws within the housing or closure support 23.

To remove the valve disc or closure unit 21 from the valve chamber 6, the cap or plate 19 which covers the open end of the said chamber is first removed to provide access to the valve chamber. The screws 45 on each side of the tubular housing or mounting member 23 are then suitably rotated so as to draw the wedge members 39 upwardly and out of wedged engagement with the inclined surfaces 35 of the tubular housing and the inside surface or wall 16 of the valve chamber. The double action of these wedge assemblies in drawing up or releasing the wedges as well as forcing them downwardly into wedging engagement only is one of the advantages and features of the present design. When the wedges have been drawn up sufficiently, the valve disc or closure unit including the attached wedge assemblies and valve disc or closure member is moved rearwardly by means of lifting ring 50 off the annular flange portion 10 of the valve seat member and then upwardly and out through the open end of the valve chamber. The unit can then be easily examined, cleaned, refinished, tested or replaced in whole or in part if so desired. The inside of the valve casing can also be examined, cleaned, and polished at this time.

In reassembling the closure member unit, it is lowered at a slight angle into the wedge shaped valve chamber and then allowed to move forwardly into receiving engagement with the protruding flange or supporting portion 10 of the valve seat member, the cylindrical surface 14 of the latter guiding the supporting or mounting member into a properly centered position for closure of the valve. The screws 45 are then tightened, forcing the wedge members 39 downwardly between the inclined wedge surfaces 35 of the removable mounting or supporting member 23 and the inside of the valve chamber in wedging engagement therewith. This action forces and holds the supporting member in relatively tight endwise abutting contact with flat annular surface 13 of the seat member 7 and into firm guiding and positioning cooperation with the outer cylindrical surface 14 of the member 23. It should be clear that the wedging force applied and consequently the pressure exerted by the supporting member 23 on the valve seat member within the body or casing is variable and depends on the adjustment of screws 45 in the threaded holes 37 of the supporting member. However, a great load is not required, for it is one of the important advantages of the present design that a pressure tight seal is not necessary between the valve seat and the housing or supporting member 23 inasmuch as the seat itself is mounted within the body in fluid sealing relation therewith. It is necessary only that the supporting member be correctly centered or guided and securely held in position to insure proper seating of the pivotally mounted closure member. In view of the above, the machining both within the casing and on the valve disc unit is reduced to a minimum. For example, the only machining within the valve body is the threading at 9 and the annular surface 12. It is also unnecessary to finish wedge surfaces 41 and 42 of the wedge members 39 and surfaces 16 and 35 within the body and on the housing members.

Lugs 17 and 49 are provided in the body and on the supporting member, respectively, to align the supporting member properly within the valve chamber, insuring particularly the substantially horizontal placement of the pivot or hinge pins 32 for freedom of action and ready response of the closure member. An abutment 48 is provided in the supporting member 23 and a stop 59 in the closure member 54 to limit the movement of the latter member in the direction of opening to the position indicated by means of dotted lines.

It should be noted that the tubular or substantially annular supporting member 23 is outwardly flared or curved at 51 towards the rear or downstream end along the lower portion thereof and that the upper portion is downwardly directed or curved at 52 towards the same end to direct the fluid into the outlet port 3 of the body or casing 1. It should also be noted that smooth fluid flow is provided through the middle portion of the valve when the same is open, the conduit-like supporting member 23 having its end limits as above defined extending rather close to the outlet port and the downstream side of the valve casing chamber.

It will be appreciated that several modifications of the structure are possible and particularly applicable to the wedging mechanism used.

Figure 3:
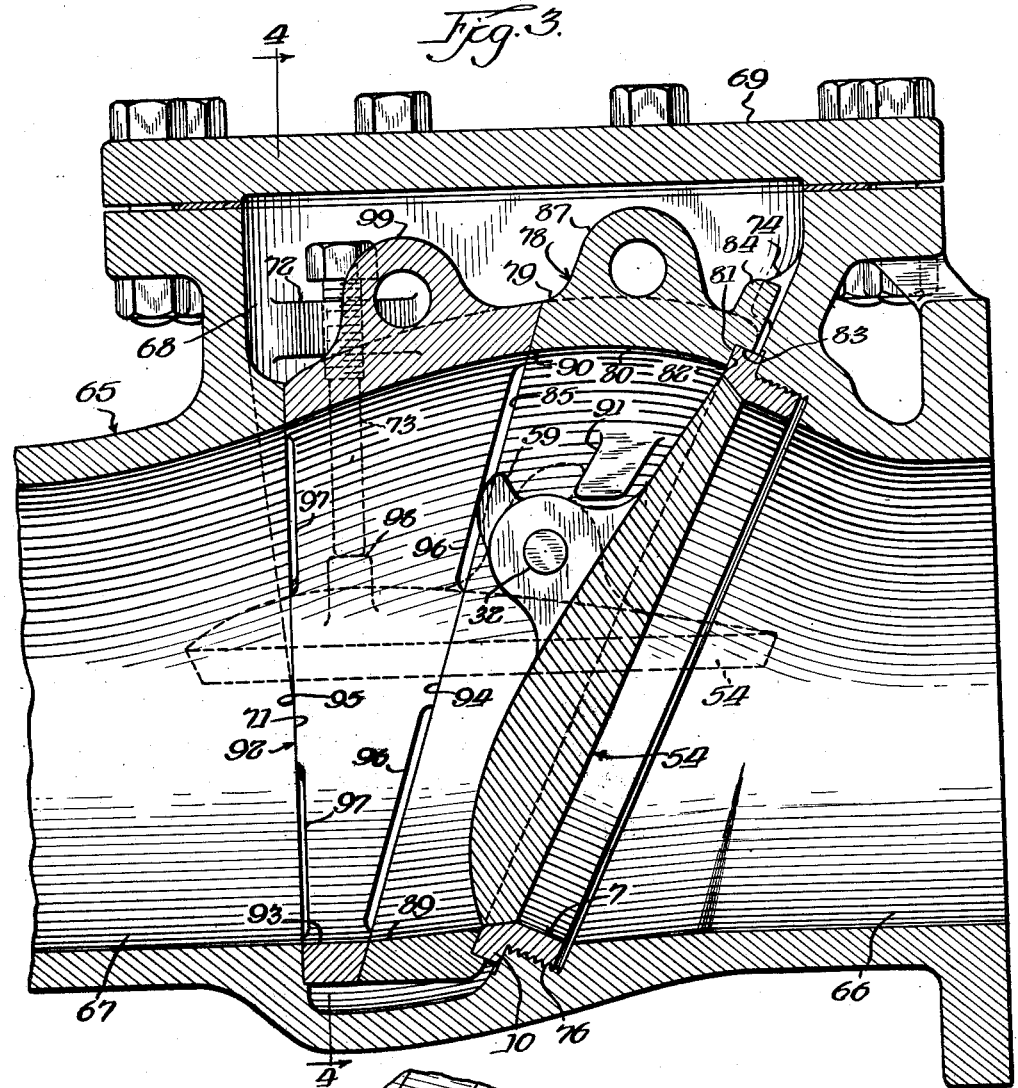
Fig. 3 is a sectional assembly view of a modified form of valve.
Figure 4:
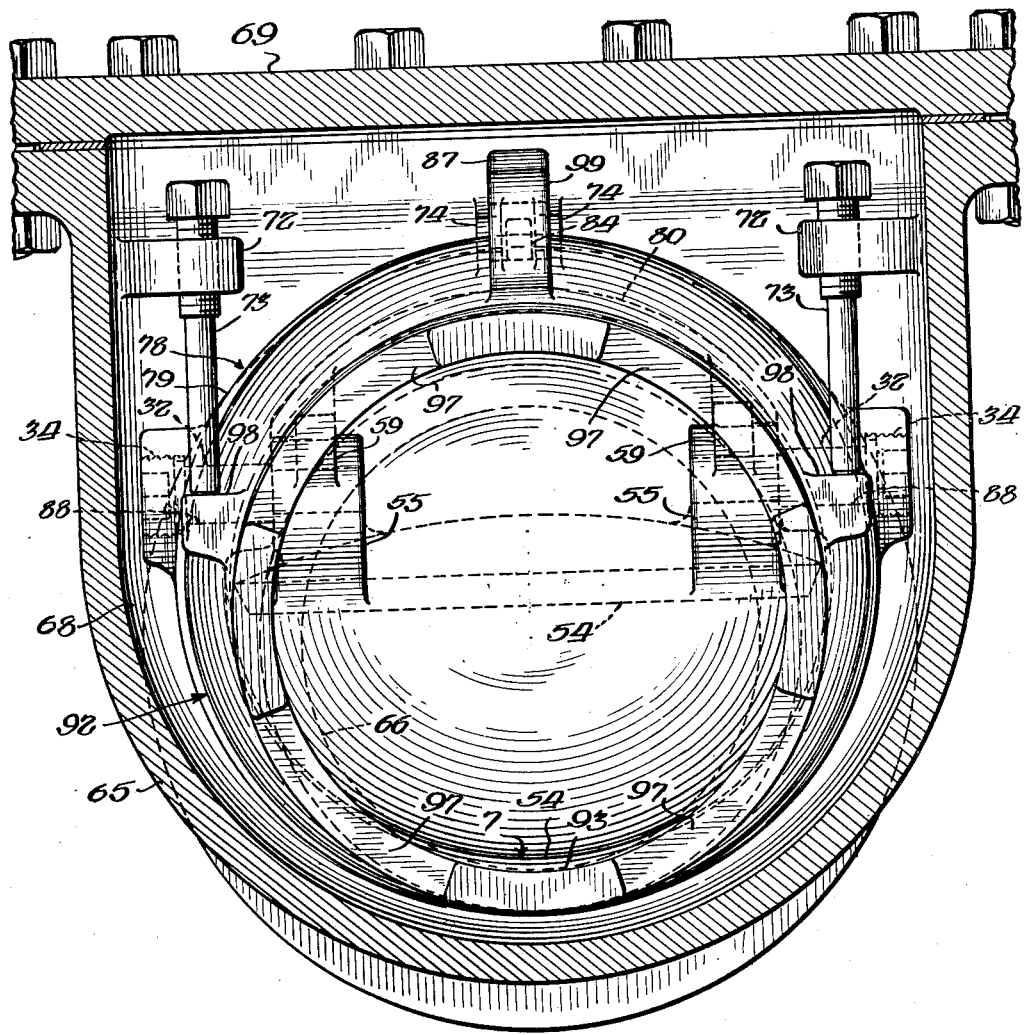
Fig. 4 is a sectional view taken on line 4—4 of Fig. 3.

A similar valve structure, but one having a different wedging or securing arrangement is disclosed in Figs. 3 and 4 of the drawings.

Referring now to the aforementioned figures, the body or casing generally designated 65 is provided with inlet and outlet ports 66 and 67 respectively and the usual line attachment flanges at the outer ends thereof. The valve casing includes a generally wedge-shaped valve chamber 68, which is preferably larger than the chamber in the first form, for the reception of a similar valve disc or closure unit, generally designated 78. This unit consists of a tubular or substantially annular housing member 79, ported and open at 80 for fluid flow therethrough and with a valve disc or closure member 54 being supported by the housing member for pivotal movement within the hollow interior thereof. The closure member is identical with that of the Fig. 1 form and cooperates with valve seat member 7. The latter member is threadedly received in the body at 76 and is also identical to that of the first embodiment above described. The closure member is pivotally supported within the housing by identical trunnions or pivot pins 32 which are received in circular recesses 88, being secured therein by the end retaining plug members 34.

A recess 81 is provided around the inner periphery of the housing or supporting member 79 at the front portion thereof, forming a flat annular shoulder 82 open to the end limit and having an adjoining cylindrical recessed surface 83 on the inside of what is in effect a protrusion or collar, the shoulder and cylindrical surface receiving and cooperating with the projecting flange portion 10 of the valve seat member 7 in the same manner and for the same purpose as described in connection with Figs. 1 and 2.

The tubular, conduit-like supporting or mounting member 79 is slightly outwardly flared or directed at 89 towards the rear or downstream end along the lower portion and also downwardly directed or curved at 90 along the top portion towards the same end as in the case of the first form. This member is also provided with an interior abutment 91 for cooperation with stop 59 of the closure member to limit the latter member in the direction of opening to the position indicated by means of dotted lines. The supporting or mounting member is further provided with lugs 84 at the top for cooperation with lug 74 on the body within the valve chamber for the same purpose as the lugs 49 and 17 in the Fig. 1 form.

In this embodiment, the tubular supporting or mounting member 79 is retained or secured in position within the valve chamber 68 by a single wedging member, generally designated 92, having annular forward and rearward surfaces 94 and 95 respectively bearing against rearwardly facing annular surface 85 of the supporting member and the inner wall or surface 71 of the valve chamber. The wedge member is ported at 93 for the passage of fluid therethrough and forms a smooth and substantially unbroken conduit in cooperation with the port 80 of the housing or supporting member 78 and the inlet and outlet ports in the body 65.

The valve casing or body 65 is provided with lugs 72 extending from the inner upper wall of the valve chamber and preferably on each side thereof, the lugs being threadedly apertured for the reception of the screws 73. The wedge member 92 is provided with a substantially horizontal surface 98 on each side (Fig. 4) upon which the screws 73 bear in abutting relation upon suitable movement inwardly. The wedging force applied to the supporting or mounting member 79 for endwise abutting and centered relation with the valve seat member 7 is variable depending upon the tightness of the screws 73 in forcing the wedge member downwardly between the supporting member and the inside of the valve chamber. It should be noted that the forward and rearward surfaces 94 and 95 respectively of the wedge member 92 have annular spaced-apart interruptions 96 and 97. These openings, which only slightly interrupt the otherwise smooth interior of the supporting member and wedge member when in position within the valve chamber, reduce the surfaces in contact, thereby reducing the frictional load and facilitating release of the wedge surfaces and the subsequent removal of the wedge member during disassembly.

To remove the valve disc or closure unit 78 for inspection and cleaning or replacement of the parts, the screws 73 are loosened and raised, and the wedge member lifted by means gripping the ring 99 out of wedging engagement and transversely upwardly through the open upper end of the valve chamber 68 after initial removal of the cap or cover plate 69. The tubular supporting member 79 is then moved rearwardly off the annular flange portion 10 of the valve seat by means of lifting ring 87 and then turned slightly and lifted transversely upwardly through the open end of the valve chamber.

Remounting of the unit is the reverse process, positioning and centering of the supporting member 79 being similar to that described in connection with the Fig. 1 form. The wedge member 92 is lowered into position at the rear of the supporting member between the same and the inner wall 71 of the valve chamber being forced downwardly therebetween by screws 73.

Recesses 25 and 81 shown at the front of the removable supporting or mounting members in Figs. 1 and 3 respectively need not necessarily be around the inner periphery of those members, but may be around the outside for abutting and positioning cooperation with outer protruding portions of slightly different valve seat members. It is also not necessary, although preferable, that these mounting members abut against the valve seat members, but they may so cooperate with inner protruding portions of the valve body or casing provided for the purpose. The latter is necessarily the case when a separate valve seat ring or member is not employed and the seating surface is ground in the body. On the other hand, when a valve seat member is threaded or otherwise securely mounted within the valve body in pressure sealed relation therewith as in Figs. 1 and 3, for instance, it becomes an integral part of the body, and by cooperating with such a seat member the supporting member constitutes an inner portion of the body or casing.

Although generally wedge or sector shaped, tubular housing or supporting members as shown in Figs. 1 and 3 are preferred for better balancing and easier endwise release from the bottom of the seat member for reduction in size and weight of the mounting member and casing, and also for facilitating smoother flow particularly in the Fig. 1 form. These members may be of uniform length or thickness from top to bottom if desired. It is also not imperative that the valve chamber, particularly in the Fig. 1 form, be wedge shaped with forward and rearward walls which are inclined with each other or that the chambers of either form be open at the top. The valve disc unit may be transversely removable through an opening in the side of each chamber, if preferred.

Various valve seat rings and connections therefor may be provided.

If a valve seat member is desired which is more easily removable and replaceable through the open end of the valve chamber than it is in the case of the above forms, a non-threaded seat member may be employed. Fig. 5 illustrates such a removable valve seat member 105 having a seating surface 106 and an outer turned surface 107 which fits snugly within cylindrical surface 109 of the valve body or casing 108. The seat member has an outer flange 111 provided with flat annular and cylindrical surfaces 112 and 113 respectively as in the threaded seat for centered reception of the supporting member 23, for instance (not shown), and also inner annular surface 114 for bearing contact with flat surface 115 of the valve body.

The turned or cylindrical surfaces 107 and 109 of the seat member and body respectively are annularly recessed or grooved opposite each other at 116 and 117, respectively, to form together an enclosed annular passageway 118 extending around the seat member as indicated by the dotted lines. Leading into and communicating with this passageway are one or more secondary passages or channels 119 at the outer ends of which are threaded recesses 124 through which plastic sealing material 121 is introduced. This material is pliable and is forced in under pressure by means of a gun or threaded plugs 122 which are screwed into the openings 124, the plastic material substantially filling the passageway 118 and forming a substantially fluid pressure tight sealed connection between the seat member 105 and the supporting portion of the body or casing 108. After the initial filling, the plug which is provided with turning means such as a socket 123 is further screwed inwardly to fill the passageway and to compress the plastic material after slight extrusion or empackment thereof. In this way, fluid pressure seal can easily be maintained.

Although the plastic material retains the seat member within the supporting portion of the body or casing during removal of the valve disc unit, the seat member can be forced out and removed in turn through the valve chamber by merely prying at the forward end. This action will shear the plastic seal without difficulty, the plastic material being later cleaned out and replaced during resealing.

Figure 6:
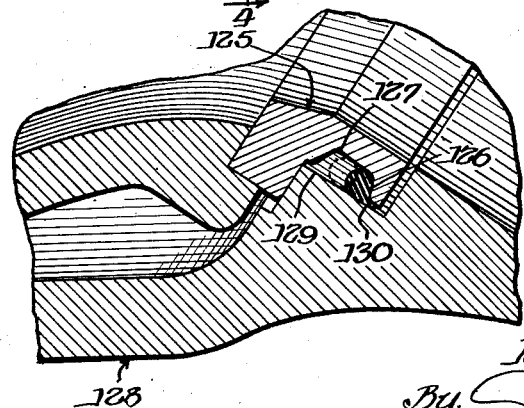
Fig. 6 is a similar view of another type of removable valve seat.

Fig. 6 shows another removable valve seat member 125 which is sealed by means of a resilient sealing ring 126 which is placed under tension into the recess 127 extending annularly around the seat member preparatory to the member being mounted within the supporting portion 129 of the body 128. When so mounted, fluid pressure forces the resilient ring to one side of the recess or groove deforming the same into the corner at 130, thus forming an effective pressure seal. Removal of the seat ring is accomplished through the open end of the valve chamber and is similar to that method employed for the plastic sealed seat ring above described.

Figure 7:
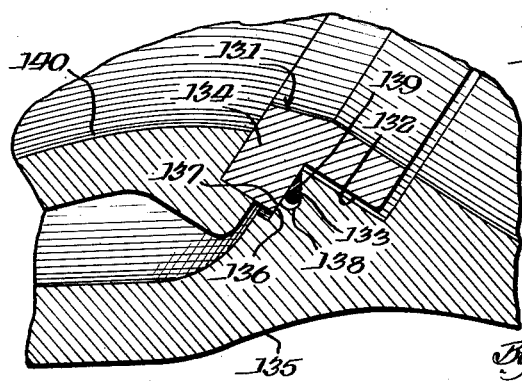
Fig. 7 is a fragmentary sectional view of a further modified form of valve seat.

Instead of sealing the valve seat member 131 around the turned or cylindrical surface 132 thereof as in the previous form, it may be desirable to interpose the resilient material or ring 133 between the flat annular faces 136 and 137 of the flanged portion 134 of the seat member 131 and body or casing 135 respectively with reference to Fig. 7. Surface 137 of the body or casing is therefore annularly grooved at 138 for the reception of the sealing material or ring 133 and when the seat member is mounted within the supporting portion of the valve body or casing, fluid pressure forces the ring inwardly into the shallow generally triangular side of the groove at 139 forming the same into an effective seal in cooperation with the endwise abutting force exerted on the seat member by the housing or supporting member 140 when firmly wedged or secured within the valve chamber. Gasket means may be used in lieu of the sealing ring if sufficient endwise force is exerted.

Although the tubular housing or supporting members and the closures mounted therein have been disclosed as of circular section or form, it is of course evident that they may be of other shapes, such as elliptical or polygonal, and it is further not essential that the closure be of the tilting disc type.

While different embodiments and variations of structure have been shown and described in setting forth the invention and other forms and variations are possible within the spirit and scope of the same, the present contribution should, of course, be measured and limited only by the appended claims.

We claim:

1. In a valve, the combination comprising a casing having a valve seat therewithin and a valve chamber, a closure member for cooperation with a seating surface formed on said valve seat, a removable supporting member carrying said closure member within the chamber of said casing, said supporting member being ported through opposite ends thereof for fluid flow, said supporting member having shoulder means adjacent one end thereof in abutting relation with an inner annular portion of said valve seat within said valve chamber and positioning said closure member for cooperation with said valve seat, said supporting member having surface means facing in an opposite direction relative to said shoulder means and inclined thereto, wedge means carried by the said supporting member cooperating with said inclined surface means of the said supporting member and an inner edge of the said valve chamber to retain said supporting member within the valve chamber in said abutting relation with said inner portion of the valve seat.

2. In a valve, the combination comprising a casing having a valve seat therewithin and a valve chamber, a closure member for cooperation with said valve seat, a removable supporting member carrying said closure member within the valve chamber of the said casing, said supporting member being tubular and substantially spanning the valve chamber for facilitating fluid flow through a portion of said valve and having recessed surface means forming a shoulder open at an end portion thereof for an abutting contact with an inner projecting portion of said casing seat to position said closure member for cooperation with said seat, the said valve seat being substantially upstream relative to said abutting contact, said supporting member having exterior surface means facing in the opposite direction relative to said shoulder but inclined thereto, removable wedge means carried by the said supporting member cooperating with said inclined surface means of the said supporting member and an inner edge portion of said valve chamber to retain said supporting member within said chamber in said abutting relation with the valve seat of said casing.

3. In a valve, the combination comprising a body having a valve seat therewithin and provided with a generally wedge shaped valve chamber open at the upper end thereof, a closure member for cooperation with a seating surface formed on said valve seat, a ported supporting member carrying said closure member within the valve chamber, said supporting member being of general wedge shaped configuration to substantially bridge the said valve chamber and being removable from said chamber through the open upper end thereof, said supporting member also having shoulder means adjacent one end in a plane downstream of said valve chamber for positioning said closure member relative to said valve seat, the seating surface of the said shoulder means and valve seat cooperating to form an annular contact therebetween, said supporting member having surface means facing in an opposite direction relative to said shoulder and inclined thereto, wedge means carried by the said supporting member cooperating with said inclined surface means and an inside surface of the said valve chamber to retain said supporting member within said chamber in said annular contact relation with said valve seat.

4. In a valve, the combination comprising a body with a valve chamber, a substantially tubular fluid conducting member within the chamber of said body, said valve chamber being open at an upper end thereof, said tubular member being removable transversely therefrom, a cover removably mounted on said body over the open end of said chamber, a valve seat within said body at one side of said chamber, a pivotally mounted closure member for cooperation with said valve seat, said closure member being supported by said tubular member for pivotal movement therewithin, said tubular member having surface means at one end thereof for positioning said tubular member in abutting relation with the said valve seat within said valve chamber and placing the said closure member to cooperate with said valve seat, said tubular member surface means being in a plane downstream of said valve seat, said tubular member having an annular portion around the valve seat extending longitudinally beyond said surface means for predetermined transverse positioning of said member within the valve chamber, said tubular member having surface means facing in an opposite direction relative to said surface means at said end and inclined thereto, surface means in the said body cooperating with said tubular member, wedge means carried by the said tubular member and bearing against said latter inclined surface means and the said surface means within said body to secure said tubular supporting member in said abutting relation and predetermined transverse position within said chamber.

5. In a valve, the combination comprising a body with a valve chamber having a shoulder portion at one end limit thereof, a substantially tubular fluid conducting member within the chamber of the said body, said chamber being open at an upper end thereof, said tubular member being removable transversely therefrom, a removable cover mounted on said body over the open end of said chamber, a valve seat within said body at one side of said chamber, a pivotally mounted closure member for cooperation with said valve seat, said closure member being supported by said tubular member for pivotal movement within the interior thereof, said tubular member being generally wedge shaped and being progressively longer towards the open end of the valve chamber, said tubular member having shoulder means adjacent one end for effecting endwise abutting relation with the said valve seat within said valve chamber, the latter endwise abutting relation being in a plane downstream of said valve seat, longitudinally disposed surface means within said body intermediate said shoulder means and said end for positioning said tubular member within the valve chamber and also positioning said closure member for cooperation with said valve seat, said tubular member having surface means facing in the opposite direction relative to said shoulder means but inclined thereto, said shoulder portion in the valve chamber cooperating with the tubular member, wedge means carried by said tubular member bearing against said inclined surface means of the tubular member and the shoulder portion within said valve chamber to secure said tubular supporting member in said abutting relation against the seat of the said chamber.

References Cited in the file of this patent

UNITED STATES PATENTS

| | | |
|---|---|---|
| 281,439 | Blessing | July 17, 1883 |
| 326,549 | D'Este | Sept. 22, 1885 |
| 1,932,348 | Long | Oct. 24, 1933 |
| 2,081,431 | Hamer | May 25, 1937 |
| 2,271,137 | Hamer | Jan. 27, 1942 |
| 2,304,491 | Allen | Dec. 8, 1942 |

FOREIGN PATENTS

| | | |
|---|---|---|
| 21,308 | Great Britain | 1905 |
| 645,777 | France | 1928 |